US012166318B2

(12) United States Patent
Nishijima et al.

(10) Patent No.: US 12,166,318 B2
(45) Date of Patent: Dec. 10, 2024

(54) ELECTROMAGNETIC SHIELD CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Seido Nishijima, Mie (JP); Akio Kimura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 349 days.

(21) Appl. No.: 17/790,925

(22) PCT Filed: Dec. 25, 2020

(86) PCT No.: PCT/JP2020/048671
§ 371 (c)(1),
(2) Date: Jul. 5, 2022

(87) PCT Pub. No.: WO2021/145198
PCT Pub. Date: Jul. 22, 2021

(65) Prior Publication Data

US 2023/0261424 A1 Aug. 17, 2023

(30) Foreign Application Priority Data

Jan. 15, 2020 (JP) ................................ 2020-004583

(51) Int. Cl.
*H01R 13/6592* (2011.01)
*H01R 13/405* (2006.01)
(Continued)

(52) U.S. Cl.
CPC ....... *H01R 13/6592* (2013.01); *H01R 13/405* (2013.01); *H01R 13/64* (2013.01); *H01R 13/6582* (2013.01)

(58) Field of Classification Search
CPC .. H01R 13/6592; H01R 13/405; H01R 13/64; H01R 13/6582
(Continued)

(56) References Cited

U.S. PATENT DOCUMENTS 9,985,364 B2 * 5/2018 Masuda ............ H01R 13/6582
10,756,493 B2 * 8/2020 Mori ...................... H01R 43/18
(Continued)

FOREIGN PATENT DOCUMENTS

JP 2014-203537 A 10/2014

OTHER PUBLICATIONS

International Search Report issued on Mar. 16, 2021 for WO 2021/145198 A1 (4 pages).

*Primary Examiner* — Gary F Paumen
(74) *Attorney, Agent, or Firm* — Venjuris, P.C.

(57) ABSTRACT

An electromagnetic shield connector is provided with a terminal-equipped shielded cable formed by mounting a terminal on an end of a shielded cable, an insulating inner housing including a first terminal fitting opening and a first wire insertion opening and configured to accommodate the terminal of the terminal-equipped shielded cable, a shield sleeve to be connected to a shield member of the shielded cable on the shielded cable and to be externally mounted on the shielded cable further on the side of the shielded cable than the terminal, an outer housing made of conductive
(Continued)

metal, including a second terminal fitting opening and a second wire insertion opening, configured to accommodate the inner housing and to be connected to the shield sleeve, and a grounding portion provided on the outer housing and connectable to an external grounding member.

6 Claims, 5 Drawing Sheets

(51) Int. Cl.
*H01R 13/64* (2006.01)
*H01R 13/6582* (2011.01)

(58) Field of Classification Search
USPC .................................................... 439/607.41
See application file for complete search history.

(56) References Cited

U.S. PATENT DOCUMENTS

| | | | |
|---|---|---|---|
| 2018/0090857 | A1 | 3/2018 | Masuda et al. |
| 2019/0296499 | A1 | 9/2019 | Mori |

* cited by examiner

ELECTROMAGNETIC SHIELD CONNECTOR

CROSS REFERENCE TO RELATED APPLICATIONS

This application is a national phase of PCT application No. PCT/JP2020/048671, filed on 25 Dec. 2020, which claims priority from Japanese patent application No. 2020-004583, filed on 15 Jan. 2020, all of which are incorporated herein by reference.

TECHNICAL FIELD

The present disclosure relates to an electromagnetic shield connector.

BACKGROUND

Conventionally, an electromagnetic shield connector having an electromagnetic shielding function is used in electric vehicles, hybrid vehicles and the like. For example, Japanese Patent Laid-open Publication No. 2018-055833 (Patent Document 1) discloses an electromagnetic shield connector having a multi-layer structure in which a shield shell is arranged outside an inner housing for accommodating a terminal-equipped shielded cable formed by connecting a terminal to an end of a shielded cable and an outer housing is further arranged outside the shield shell. A shield member such as a braided wire surrounding a core wire of the shielded cable is brought into conduction with the shield shell via a shield sleeve externally fit on the shielded cable, and further brought into conduction with a shield shell of a mating connector to obtain an electromagnetic shielding effect.

PRIOR ART DOCUMENT

Patent Document

Patent Document 1: JP 2018-055833 A

SUMMARY OF THE INVENTION

Problems to be Solved

However, the electromagnetic shield connector having a conventional structure has had an inherent problem that a configuration is complicated and enlargement is unavoidable due to the multi-layer structure composed of the inner housing, the shield shell and the outer housing. There has been also a problem that it is difficult to confirm from outside whether or not the shield shell is reliably grounded.

Accordingly, an electromagnetic shield connector of a novel structure is disclosed which has a simple configuration, can be reduced in size and enables the grounding of a shielded cable to be easily confirmed from outside.

Means to Solve the Problem

The present disclosure is directed to an electromagnetic shield connector with a terminal-equipped shielded cable formed by mounting a terminal on an end of a shielded cable, an insulating inner housing including a first terminal fitting opening and a first wire insertion opening and configured to accommodate the terminal of the terminal-equipped shielded cable, a shield sleeve to be connected to a shield member of the shielded cable on the end of the shielded cable and to be externally mounted on the shielded cable further on the shielded cable side than the terminal, an outer housing made of conductive metal, including a second terminal fitting opening and a second wire insertion opening, configured to accommodate the inner housing and to be connected to the shield sleeve, and a grounding portion provided on the outer housing and connectable to an external grounding member, an engaging portion to be engaged with the inner housing and a connecting portion arranged at the same axial position as the engaging portion and to be connected to the outer housing being provided on an end part of the shield sleeve on the inner housing side.

Effect of the Invention

According to the present disclosure, it is possible to provide an electromagnetic shield connector of a novel structure which has a simple configuration, can be reduced in size and enables the grounding of a shielded cable to be easily confirmed from outside.

DETAILED DESCRIPTION TO EXECUTE THE INVENTION

Description of Embodiments of Present Disclosure

Figure 1:
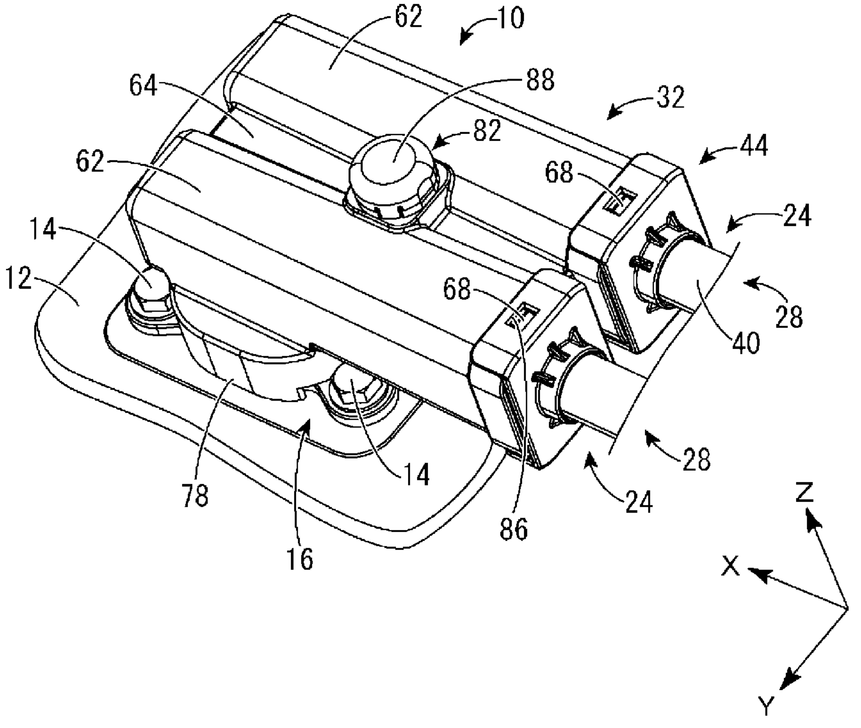
FIG. 1 is an overall perspective view showing an electromagnetic shield connector according to one embodiment of the present disclosure and a mating connector mounted on a case.

First, embodiments of the present disclosure are listed and described.

(1) The electromagnetic shield connector of the present disclosure is provided with a terminal-equipped shielded cable formed by mounting a terminal on an end of a shielded cable, an insulating inner housing including a first terminal fitting opening and a first wire insertion opening and configured to accommodate the terminal of the terminal-equipped shielded cable, a shield sleeve to be connected to a shield member of the shielded cable on the end of the shielded cable and to be externally mounted on the shielded cable further on the shielded cable side than the terminal, an outer housing made of conductive metal, including a second terminal fitting opening and a second wire insertion opening, configured to accommodate the inner housing and to be connected to the shield sleeve, and a grounding portion provided on the outer housing and connectable to an external grounding member, an engaging portion to be engaged with the inner housing and a connecting portion arranged at the same axial position as the engaging portion and to be connected to the outer housing being provided on an end part of the shield sleeve on the inner housing side.

According to the electromagnetic shield connector of the present disclosure, a shield shell for covering an inner housing, which shield shell has been required in a conventional structure, can be made unnecessary by making the outer housing for accommodating the inner housing of conductive metal while ensuring insulation by accommodating the terminal of the terminal-equipped shielded cable in the insulating inner housing. In this way, a configuration can be simplified and reduced in size as compared to an electromagnetic shield connector of a conventional structure having a multi-layer structure composed of an inner housing, a shield shell and an outer housing.

Further, since the outer housing is made of conductive metal, the radiation of electromagnetic waves from the connector can be suppressed similarly to the conventional structure including the shield shell. Furthermore, the shield sleeve connected to the shield member of the shielded cable is exposed to the outside of the inner housing and connected to the outer housing made of conductive metal, and the outer housing is provided with the grounding portion connectable to the external grounding member. In this way, a structure for grounding the shield member of the shielded cable can also be simplified, the grounding of the shielded cable can be easily confirmed from outside, and assemblability can also be improved. Further, by providing the engaging portion with the inner housing on the end part of the shield sleeve on the inner housing side, the inner housing can be reliably positioned and fixed by the shield sleeve while the shield sleeve is reliably exposed from the inner housing, and the insulation of the terminal can be ensured by a small number of components. Furthermore, since the shield sleeve is provided with the connecting portion to the outer housing at the same axial position as the engaging portion, the shield sleeve and the electromagnetic shield connector including the shield sleeve can be reduced in size in a length direction.

(2) Preferably, the grounding portions of the outer housing are provided on both sides across the second terminal fitting opening. This is because, by providing the grounding portions on the both sides across the second terminal fitting opening where a contact point of the terminal with a mating terminal is exposed, grounding points of the shielded cable can be provided before and after the contact point in which a current flows, the radiation of electromagnetic waves can be satisfactorily suppressed and the occurrence of problems such as the leakage of noise can be prevented or reduced.

(3) Preferably, in (2), the grounding portions are shaped to project toward the external grounding member and provided at three or more positions distributed on the both sides across the second terminal fitting opening. This is because the grounding points of the shielded cable can be provided at three or more positions distributed before and after the contact point in which the current flows, and both the satisfactory suppression of the radiation of electromagnetic waves and the stable fixing of the outer housing can be realized. Particularly, since the grounding portions are shaped to project toward the external grounding member, a fixed state of the outer housing to the grounding member can be easily confirmed and assembling workability can be improved.

(4) Preferably, the external grounding member is a case made of conductive metal, a mating connector being mounted on the case, and the grounding portion is provided with a through hole, a connection bolt used to fix the outer housing to the case being passed through the through hole. This is because, since the grounding portion is provided with the through hole through which the connection bolt is passed, the grounding portion can be provided, using a formation region of the through hole for the connection bolt, which region is necessary in the first place, and such a use can contribute to the size reduction of the connector. Moreover, the separation of the grounding portion from the case and the like can be reliably prevented.

(5) Preferably, in the shield sleeve, one end part is externally mounted on the shielded cable and another end part has a larger diameter than the one end part and externally mounted on an end part of the inner housing on a side where the first wire insertion opening is provided, and the engaging portion and the connecting portion are provided in a part of the shield sleeve externally mounted on the inner housing.

(6) Preferably, the entire inner housing is accommodated in the outer housing.

Details of Embodiment of Present Disclosure

A specific example of an electromagnetic shield connector of the present disclosure are described below with reference to the drawings. Note that the present disclosure is not limited to these illustrations and is intended to be represented by claims and include all changes in the scope of claims and in the meaning and scope of equivalents.

Embodiment

Figure 2:
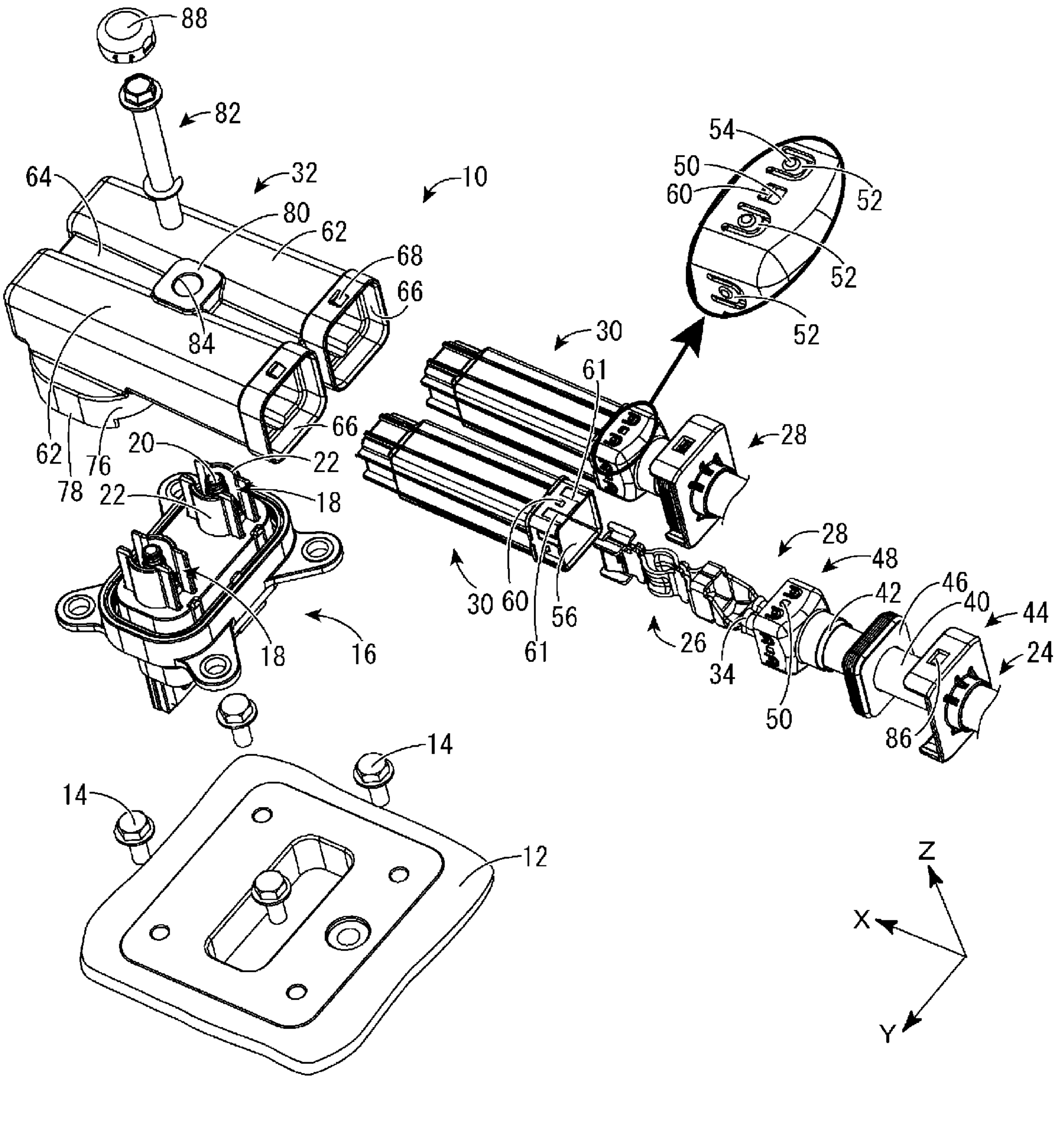
FIG. 2 is an exploded perspective view of FIG. 1.

Hereinafter, one embodiment of the present disclosure is described with reference to FIGS. 1 to 5. An electromagnetic shield connector 10 is fixed to a part of a case 12 of an electrical device such as an inverter. In particular, as shown in FIGS. 2, 4 and 5, the electromagnetic shield connector 10 is connected and fixed in a height direction to a mating connector 16 made of synthetic resin and fixed to the case 12 made of conductive metal using screws 14. Note that, in the following description, a Z direction is referred to as an upward direction, a Y direction is referred to as a width direction and an X direction is referred to as a forward direction along a length direction. Further, for a plurality of identical members, only some members may be denoted by a reference sign and the other members may not be denoted by the reference sign.

<Mating Connector 16>

As shown in FIG. 2, the mating connector 16 is provided with a pair of mating terminals 18, 18 projecting upward (Z direction) along the height direction. Further, an insulating cap 20 is mounted on a tip part of each mating terminal 18, and a pair of side walls 22, 22 are respectively provided around a part of each mating terminal 18 other than the tip part. In this way, the touch of the hand of a worker or the like with metal-made parts of the mating connector 16 is advantageously prevented.

<Electromagnetic Shield Connector 10>

Figure 3:
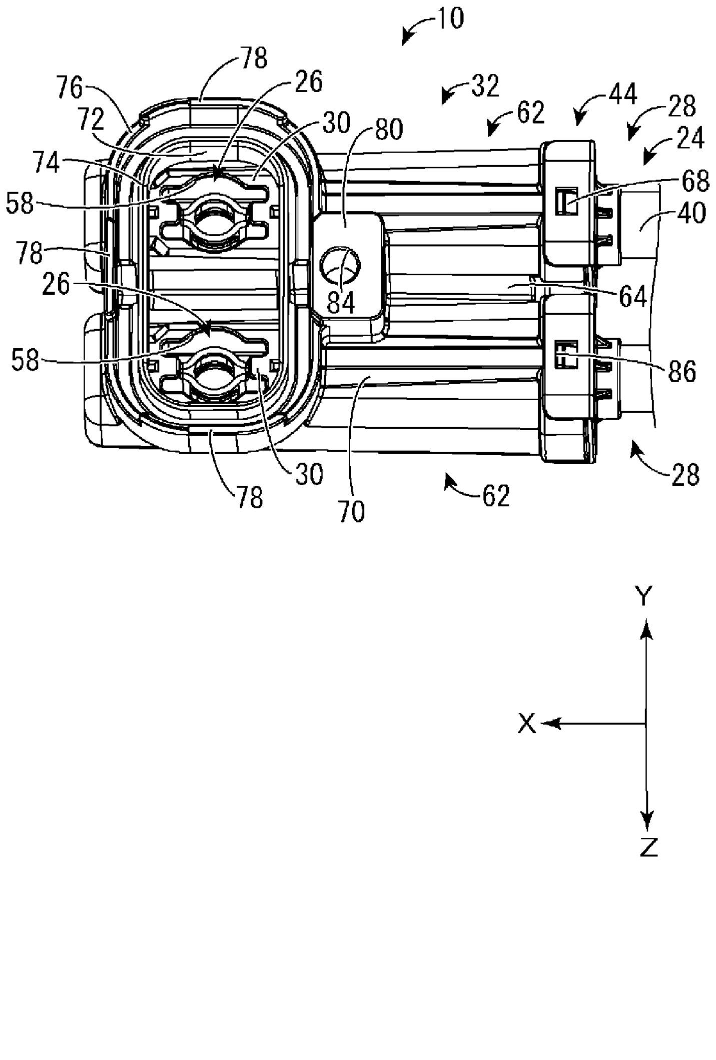
FIG. 3 is a perspective view of the electromagnetic shield connector shown in FIG. 2 viewed from a bottom surface side (connection bolt is not shown to facilitate understanding).
Figure 4:
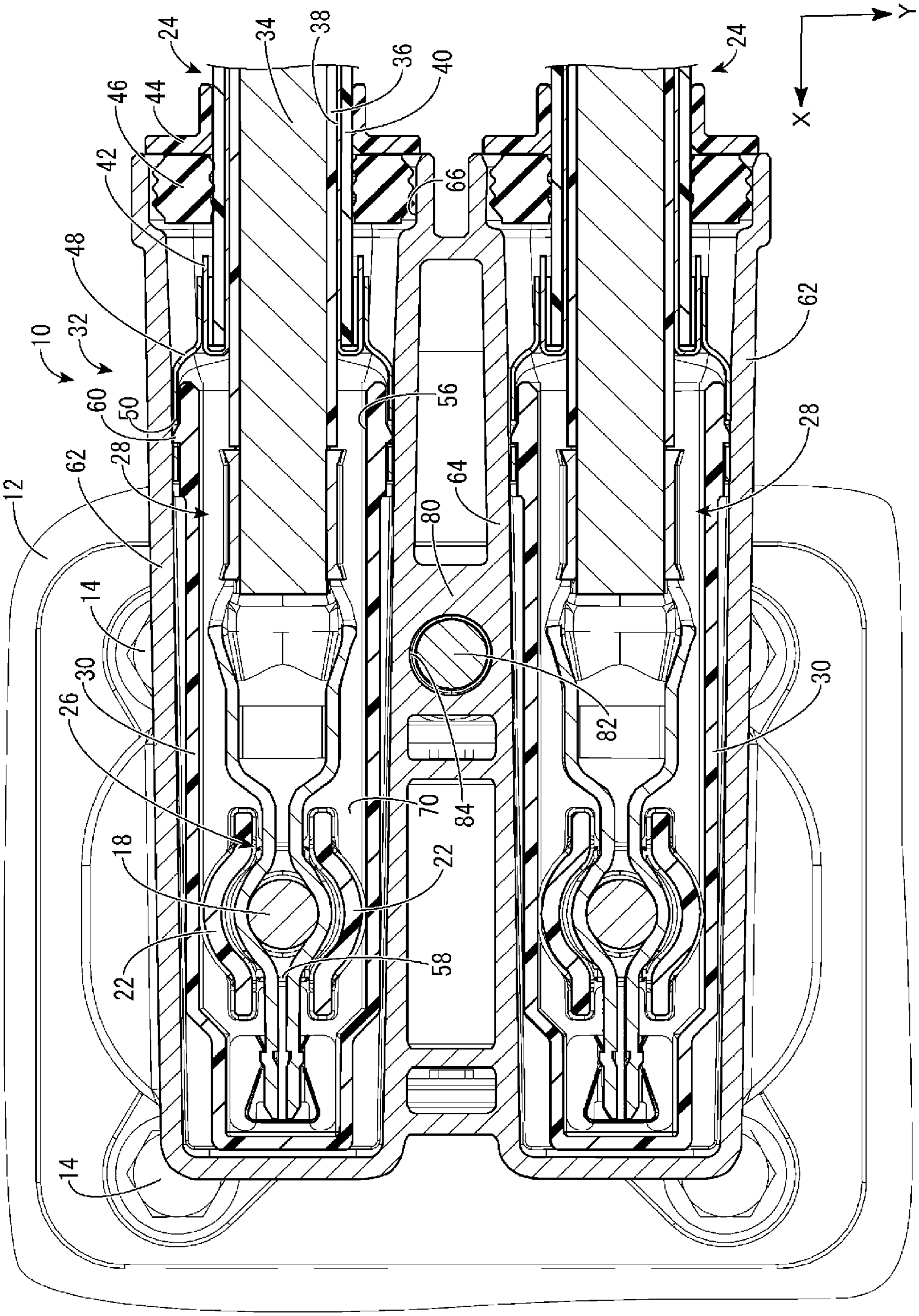
FIG. 4 is an enlarged longitudinal section cut along a length direction of FIG. 1.
Figure 5:
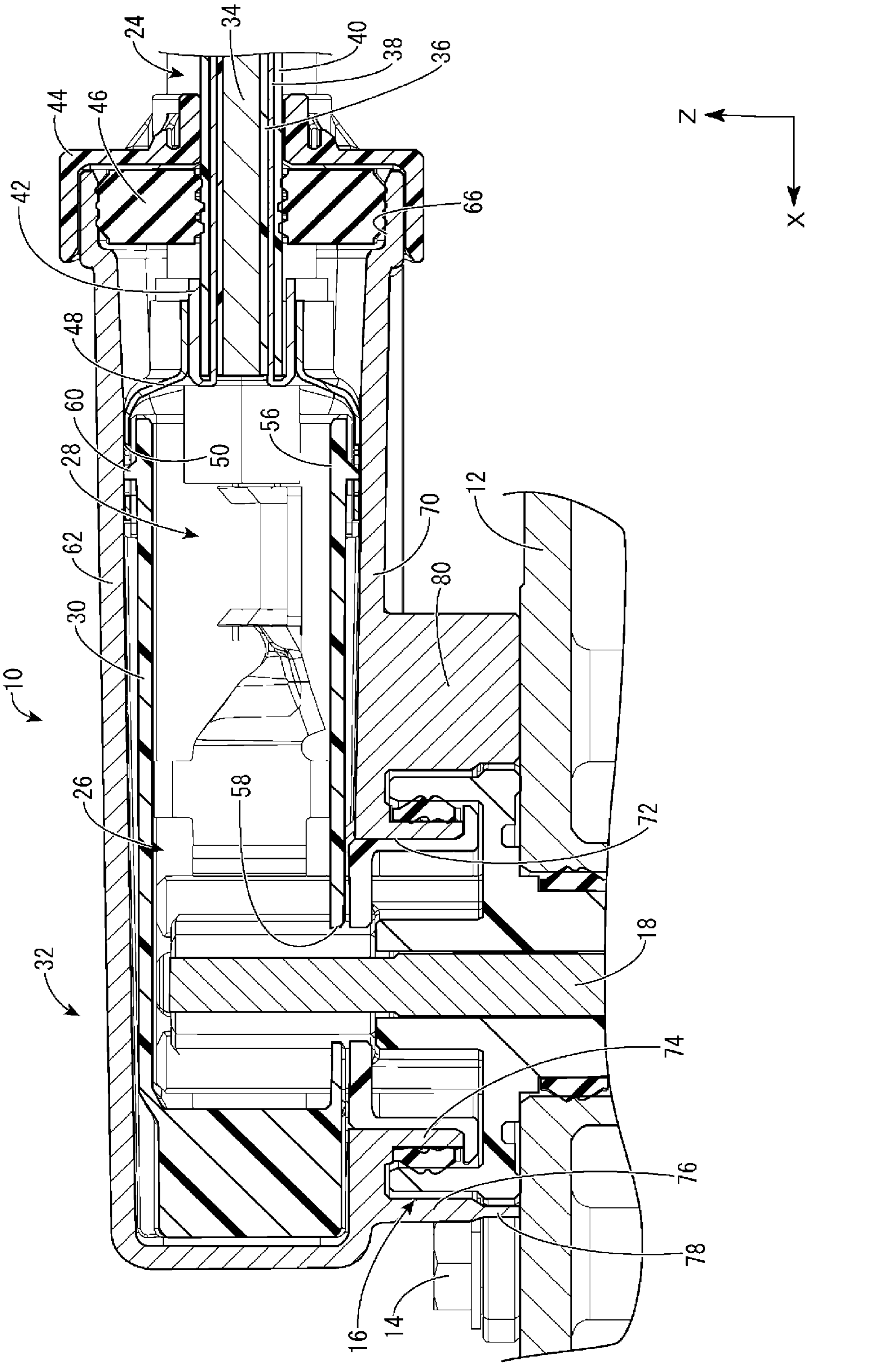
FIG. 5 is another enlarged longitudinal section cut along the length direction of FIG. 1.

As shown in FIGS. 2 to 4, the electromagnetic shield connector 10 includes two terminal-equipped shielded cables 28 each formed by mounting a female terminal 26 on an end of a shielded cable 24, and an insulating inner housing 30 made of synthetic resin for accommodating the female terminals 26 of the respective terminal-equipped shielded cables 28. Further, the electromagnetic shield connector 10 includes an outer housing 32 made of conductive metal.

<Terminal-Equipped Shielded Cables 28>

As shown in FIG. 4, the shielded cable 24 constituting the terminal-equipped shielded cable 28 includes a core wire 34, an inner insulation coating 36 covering the outer periphery of the core wire 34, a shield member 38 covering the outer periphery of the inner insulation coating 36 and an outer insulation coating 40 covering the outer periphery of the shield member 38. The shield member 38 is, for example, a braided wire formed by braiding conductive strands of aluminum alloy or the like into a tubular shape, and has flexibility. The female terminal 26 is electrically connected to a tip part of the core wire 34 exposed to outside. Further, as shown in FIGS. 2 and 4, the shield member 38 is folded outside the outer insulation coating 40 to provide a shield member folded portion 42 on an end of the shielded cable 24. Note that a back retainer 44 and a sealing member 46 are mounted in advance on a side behind the shield member folded portion 42 (side of the shielded cable 24) on the end of the shielded cable 24.

<Shield Sleeve 48>

The shield member folded portion 42 is connected to the shield sleeve 48. In this way, the shield sleeve 48 is electrically connected to the shield member 38. More particularly, the shield sleeve 48 has a tubular shape open in the front-rear direction (X direction and a direction opposite to the X direction), a base end side thereof is formed into a hollow cylindrical shape and a tip side thereof is formed into a rectangular tube shape having a larger dimension than the base end side. The inner surface of the base end side of the shield sleeve 48 is pressed into contact with the shield member folded portion 42. That is, the shield sleeve 48 is externally mounted on and electrically connected to the shield member folded portion 42 provided on the shielded cable 24 further on the side of the shielded cable 24 than the female terminal 26. Further, hole-like engaging portions 50 having a rectangular cross-sectional shape are provided on the tip side of the shield sleeve 48 having a rectangular tube shape to respectively penetrate in a plate thickness direction through four surfaces while being spaced apart in a circumferential direction of a tubular outer peripheral surface to be externally fit on a rear end side (side opposite to the X direction of FIG. 4) of the inner housing 30. That is, the hole-like engaging portions 50 to be engaged with the inner housing 30 are provided on an end part of the tip side (side of the inner housing 30) of the shield sleeve 48 to be externally fit on the inner housing 30. Resilient contact pieces 52 in the form of cantilevers coupled to the tip side are formed by cutting the outer peripheral surface in the plate thickness direction to form slits on both sides of the engaging portion 50 in the circumferential direction, and connecting portions 54 in the form of spherical shells project on the outer surfaces of the resilient contact pieces 52 (see FIG. 2). That is, the connecting portions 54 to be connected to the outer housing 32 as described later are provided at the same axial position of the shield sleeve 48 as the engaging portions 50 on the end part of the tip side (side of the inner housing 30) of the shield sleeve 48 to be externally fit to the inner housing 30.

<Inner Housing 30>

As shown in FIGS. 2 to 4, each inner housing 30 has a bottomed rectangular tube shape open toward a rear side (side opposite to the X direction). Each inner housing 30 includes a first wire insertion opening 56 open on the rear side and a first terminal fitting opening 38 open downward (toward the mating terminal 18) on a front side. The first terminal fitting opening 58 is constituted by a rectangular through hole penetrating in a plate thickness direction (see FIG. 3). Engaging projections 60 respectively having a triangular cross-sectional shape and extending in a circumferential direction project on four surfaces on an outer peripheral surface near a peripheral edge part of the first wire insertion opening 56 while being spaced apart in the circumferential direction. Further, recesses 61 having a rectangular cross-sectional shape are formed on both sides of each engaging projection 60 in the circumferential direction (see FIG. 2).

<Outer Housing 32>

As shown in FIG. 2, the outer housing 32 is made of conductive metal and includes a pair of inner housing accommodating tube portions 62, 62 extending along the length direction and arranged in parallel for respectively accommodating and holding the two inner housings 30, and a coupling portion 64 coupling the pair of inner housing accommodating tube portions 62, 62 and extending in the length direction. Each inner housing accommodating tube portion 62 has a bottomed rectangular tube shape open rearward and can accommodate the inner housing 30 inside. The second wire insertion openings 66 are formed by openings of the pair of inner housing accommodating tube portions 62, 62. Engaging projections 68 having a triangular cross-sectional shape and extending in the circumferential direction project on upper and lower surfaces near an opening peripheral edge part of each inner housing accommodating tube portion 62. Further, as shown in FIG. 3, a second terminal fitting opening 72 open downward (toward the mating terminals 18) is provided by cutting a bottom wall 70 on a front side of the outer housing 32. Double walls 74, 76 are provided on the peripheral edge part of the second terminal fitting opening 72. The inner wall 74 provided on the side of the second terminal fitting opening 72 projects downward by a fixed projecting dimension. The outer wall 76 provided on a side more away from the second terminal fitting opening 72 than the inner wall 74 is larger than the inner wall 74 and projects downward by a fixed projecting dimension. Grounding portions 78 projecting downward by a fixed projecting dimension are further provided at three positions separated in the circumferential direction on a projecting end part of the outer wall 76. In addition, a bolt fastening portion 80 having a rectangular cross-sectional shape and projecting downward by the same projecting dimension as the grounding portions 78 is provided on a rear side of the outer peripheral surface of the outer wall 76, and a through hole 84 which has a circular cross-sectional shape and through which a connection bolt 82 is passed is provided to vertically penetrate through the bolt fastening portion 80. The bolt fastening portion 80 is fixed to the case 12 by the connection bolt 82, thereby being stably pressed into contact with the case 12 over a wide area without rattling. Thus, the bolt fastening portion 80 also constitutes a grounding portion. That is, as shown in FIG. 3, the grounding portions 78, 80 of the outer housing 32 are provided on both sides in the front-rear direction and both sides in the width direction across the second terminal fitting opening 72. Further, as shown in FIGS. 1 and 2, the grounding portions 78, 80 are all shaped to project toward the case 12 made of conductive metal, on which the mating connector 16 is mounted, and provided at four positions distributed on the both sides across the second terminal fitting opening 72.

<Assembling Method of Electromagnetic Shield Connector 10>

As shown in FIG. 2, the two terminal-equipped shielded cables 28 are first prepared. That is, the shield member 38 exposed by stripping the outer insulation coating 40 on the end of the shielded cable 24 is folded onto the outer side of the outer insulation coating 40 to form the shield member folded portion 42. The inner surface of the base end side of the shield sleeve 48 is pressed into contact with the shield member folded portion 42. In this way, the shield member 38 of the shielded cable 24 and the shield sleeve 48 are electrically connected. Subsequently, the outer insulation coating 40 on the end of the shielded cable 24 where the inner insulation coating 36 is exposed by folding the shield member 38 is stripped and the female terminal 26 is fixed to the exposed core wire 34, for example, by crimping, whereby the core wire 34 of the shielded cable 24 and the mating terminal 26 are electrically connected. In this way, the terminal-equipped shielded cable 28 is completed. Note that the back retainer 44 and the sealing member 46 are mounted on the terminal-equipped shielded cable 28 as shown in FIG. 2.

Subsequently, as shown in FIG. 2, the female terminals 26 of the two terminal-equipped shielded cables 28 are respectively inserted into the inner housings 30 through the first wire insertion openings 56 and the tip sides of the shield sleeves 48 are fit to the outer peripheral surfaces of the inner housings 30 near the peripheral edge parts of the first wire insertion openings 56. In this way, the engaging portions 50 of the shield sleeves 48 are fit to the engaging projections 60 of the inner housings 30, and the shield sleeves 48 are stably held to cover the first wire insertion openings 56 of the inner housings 30. The two terminal-equipped shielded cables 28 having the inner housings 30 mounted thereon are respectively accommodated into the inner housing accommodating tube portions 62 of the outer housing 32. Subsequently, the sealing members 46 for sealing between the shielded cables 24 and the inner housing accommodating tube portions 62 of the outer housings 32 in a liquid-tight manner are mounted in the second wire insertion openings 66 of the outer housing 32. The sealing members 46 are held on the side of the second wire insertion openings 66 of the outer housing 32 by fitting engaging holes 86 of the back retainer 44 to the engaging projections 68 of the outer housing 32. In this state, the connecting portions 54 of the resilient contact pieces 52 provided on the tip sides of the shield sleeves 48 are pressed into contact with the inner surfaces of the inner housing accommodating tube portions 62. In this way, the resilient contact pieces 52 are resiliently deformed in directions separating from the inner surfaces of the inner housing accommodating tube portions 62, but such resilient deformations are allowed by the recesses 61 provided in the inner housings 30. Therefore, the shield sleeves 48 are stably connected to the outer housing 32. As a result of the above, the electromagnetic shield connector 10 is completed.

In a state where the terminal-equipped shielded cables 28 having the inner housings 30 mounted thereon are accommodated and stably held in the inner housing accommodating tube portions 62 of the outer housing 32 as shown in FIG. 3, the female terminals 26 are exposed through the second terminal fitting opening 72 of the outer housing 32 and the first terminal fitting openings 58 of the inner housings 30. By assembling the mating terminals 18 of the mating connector 16 mounted on the case 12 with the exposed female terminals 26 of the terminal-equipped shielded cable 10, the female terminals 26 and the mating terminals 18 are electrically connected to each other. At this time, the outer housing 32 of the electromagnetic shield connector 10 is fixed to the case 12 by the connection bolt 82. Further, an insulating cap 88 made of synthetic resin is put on a head part of the connection bolt 82. As a result, as shown in FIGS. 3 and 5, the grounding portions 78, 80 provided in the outer housing 32 come into contact with the case 12 constituting an external grounding member and are electrically connected thereto. Here, in the electromagnetic shield connector 10, the shield members 38 of the shielded cables 24 are connected to the outer housing 32 via the shield member folded portions 42 and the shield sleeves 48 and further connected to the case 12 as the external grounding member via the grounding portions 78, 80 of the outer housing 32.

According to the electromagnetic shield connector 10 of the present disclosure structured as described above, insulation is ensured by accommodating the female terminals 26 of the terminal-equipped shielded cables 28 into the insulating inner housings 30. Further, by making the outer housing 32 for accommodating the inner housings 30 of conductive metal, the shield members 38 can be connected to the outer housing 32 via the shield sleeves 48. In this way, a shield shell for covering an inner housing as before can be made unnecessary, and a configuration can be simplified and reduced in size as compared to an electromagnetic shield connector of a conventional structure having a multi-layer structure composed of an inner housing, a shield shell and an outer housing. Moreover, the outer housing 32 and the case 12 are made of conductive metal, and the female terminals 26 of the electromagnetic shield connector 10 and the mating terminals 18 of the mating connector 16 are surrounded by the outer housing 32 and the case 12. Thus, similarly to the conventional structure, the radiation of electromagnetic waves from the electromagnetic shield connector 10 and the mating connector 16 can be suppressed. Furthermore, since the grounding portions 78, 80 provided in the outer housing 32 are connected to the case 12 as the external grounding member via the shield sleeves 48 of the shield members 38 of the terminal-equipped shielded cables 28 and the outer housing 32, the grounding of the shielded cables 24 can be easily confirmed from outside while being stably realized, and assemblability can also be improved.

Since the grounding portions 78, 80 are provided on the both sides of the second terminal fitting opening 72 where the female terminals 26 and the mating terminals 18 are connected, the leakage of noise from contact points of the female terminals 26 with the mating terminals 18 and the radiation of electromagnetic waves from the female terminals 26 and the mating terminals 18 can be satisfactorily suppressed. Further, since the grounding portions 78, 80 are provided at four positions on the both sides of the second terminal fitting opening 72 where the contact points of the female terminals 26 with the mating terminals 18 are located, both the satisfactory suppression of the radiation of electromagnetic waves and the stable fixing of the outer housing 32 can be realized. Further, since the grounding portions 78, 80 are shaped to project toward the case 12, a fixed state of the grounding portions 78, 80 to the case 12 can be easily confirmed from outside and a grounded state of each grounding portion 78, 80 can be confirmed and assembling workability can be improved. In addition, the use of the conventional bolt fastening portion 80 as the grounding portion can contribute to the size reduction of the electromagnetic shield connector 10.

By providing the hole-like engaging portions 50 to be engaged with the inner housing 30 on the end part of the shield sleeve 48 on the side of the inner housing 30, the shield sleeve 48 can be reliably positioned and fixed to the inner housing 30 while being reliably exposed toward the outer housing 32. In this way, the electromagnetic shield connector 10 and a shield of the mating connector 16 can be connected while the insulation of the female terminals 26 is ensured by a small number of components. Since the connecting portions 54 to the outer housing 32 are provided at the same axial position as the engaging portions 50 with the inner housing 30, the shield sleeve 48 and the electromagnetic shield connector 10 can be reduced in size in the length direction.

Other Embodiment

The technique described in this specification is not limited to the above described and illustrated embodiment. For example, the following embodiment is also included in the technical scope of the technique described in this specification.

(1) Although the above embodiment is described taking as an example a case where the grounding portions 78, 80 of the outer housing 32 are provided at a total of four positions on the both sides in the front-rear direction and the both sides in the width direction across the second terminal fitting opening 72, there is no limitation to this. Grounding portion (s) of the outer housing 32 may be provided at one position or an arbitrary number of positions equal to or more than two positions.

LIST OF REFERENCE NUMERALS

10 electromagnetic shield connector
12 case (external grounding member)
14 screw
16 mating connector
18 mating terminal
20 cap
22 side wall
24 shielded cable
26 female terminal (terminal)
28 terminal-equipped shielded cable
30 inner housing
32 outer housing
34 core wire
36 inner insulation coating
38 shield member
40 outer insulation coating
42 shield member folded portion
44 back retainer
46 sealing member
48 shield sleeve
50 engaging portion
52 resilient contact piece
54 connecting portion
56 first wire insertion opening
58 first terminal fitting opening
60 engaging projection
61 recess
62 inner housing accommodating tube portion
64 coupling portion
66 second wire insertion opening
68 engaging projection
70 bottom wall
72 second terminal fitting opening
74 inner wall
76 outer wall
78 grounding portion
80 bolt fastening portion (grounding portion)
82 connection bolt
84 through hole
86 engaging hole
88 cap

What is claimed is:

1. An electromagnetic shield connector, comprising:

a terminal-equipped shielded cable formed by mounting a terminal on an end of a shielded cable;

an insulating inner housing including a first terminal fitting opening and a first wire insertion opening and configured to accommodate the terminal of the terminal-equipped shielded cable;

a shield sleeve to be connected to a shield member of the shielded cable on the end of the shielded cable and to be externally mounted on the shielded cable further on the shielded cable side than the terminal;

an outer housing made of conductive metal, including a second terminal fitting opening and a second wire insertion opening, configured to accommodate the inner housing and to be connected to the shield sleeve; and a grounding portion provided on the outer housing and connectable to an external grounding member, an engaging portion to be engaged with the inner housing and a connecting portion arranged at the same axial position as the engaging portion and to be connected to the outer housing being provided on an end part of the shield sleeve on the inner housing side.

2. The electromagnetic shield connector of claim 1, wherein the grounding portions of the outer housing are provided on both sides across the second terminal fitting opening.

3. The electromagnetic shield connector of claim 2, wherein the grounding portions are shaped to project toward the external grounding member and provided at three or more positions distributed on the both sides across the second terminal fitting opening.

4. The electromagnetic shield connector of claim 1, wherein the external grounding member is a case made of conductive metal, a mating connector being mounted on the case, and the grounding portion is provided with a through hole, a connection bolt used to fix the outer housing to the case being passed through the through hole.

5. The electromagnetic shield connector of claim 1 in the shield sleeve, one end part is externally mounted on the shielded cable and another end part has a larger diameter than the one end part and externally mounted on an end part of the inner housing on a side where the first wire insertion opening is provided, and the engaging portion and the connecting portion are provided in a part of the shield sleeve externally mounted on the inner housing.

6. The electromagnetic shield connector of claim 1, wherein the entire inner housing is accommodated in the outer housing.

* * * * *